United States Patent [19]

Eickmann

[11] Patent Number: 4,712,381
[45] Date of Patent: Dec. 15, 1987

[54] FLUID HANDLING ELEMENTS AND COMBUSTION ENGINES

[76] Inventor: Karl Eickmann, 2420 Isshiki, Hayama-machi, Kanagawa-ken, Japan

[21] Appl. No.: 665,482

[22] Filed: Oct. 29, 1984

Related U.S. Application Data

[63] Continuation-in-part of Ser. No. 282,990, Jul. 14, 1981, Pat. No. 4,557,347, and a continuation-in-part of Ser. No. 338,741, Jan. 12, 1982, Pat. No. 4,480,532, and a continuation-in-part of Ser. No. 468,106, Feb. 22, 1983, abandoned, and a continuation-in-part of Ser. No. 529,254, Sep. 6, 1983.

[51] Int. Cl.⁴ ............................................. F01B 29/04
[52] U.S. Cl. ........................................ 60/712; 92/144

[58] Field of Search ................ 60/514, 646, 657, 670, 60/712; 92/144; 123/193 C

[56] References Cited

U.S. PATENT DOCUMENTS

4,480,532 11/1984 Eickmann ............................ 92/144

Primary Examiner—Stephen F. Husar

[57] ABSTRACT

A cylinder in a fluid handling device in which high pressures and temperature vary in a periodic cycle. An outer chamber surrounding the cylinder in which a pressurized fluid is used to equalize the pressure inside and outside the cylinder wall to prevent breaking under high internal pressures. The pressurized fluid is also transferred from the outer chamber for use in the cylinder of the fluid handling device.

2 Claims, 11 Drawing Figures

$tg.x = \Delta Y/\Delta R$
$\Delta Y = \Delta R \, tg.x$
$dY = tg.x \, dR$
$f = tg.x_f (R_o - r_i)$
$dA = (1/2) dR \, dY$
$= 0.5 \, dR \times tg.x \, dR$
$= 0.5 \, tg.x \, dR \, dR$
$dV = dA \, \phi \, \overline{T} = dA \, 2R\overline{T}$
$= 2R \, \overline{T} \, dA$
$= 2R \, \overline{T} \, 0.5 \, tg.x \, dR \, dR$
$V = \int \overline{T} tg.x \, R \, dR \, dR = \overline{T} tg.x \int R \, dR \, dR = \overline{T} tg.x \int (1/2) R^2 dR = \overline{T} tg.x (1/2)(1/3) R^3$
$= \overline{T} tg.x (1/6) R^3$ in bondaries $\big|_{r_i}^{R_o}$ = $V = (\overline{T}/6) \, tangent \, x \, [R_o^3 - r_i^3]$ $V_{ELEMENT} = (\overline{T}/6) \, tang \, x \, (R_o^3 - r_i^3)$
$V_{TOTAL} = (\overline{T}/6) \, tang \, x \, (R_o^3 - r_i^3) + r_i^2 \overline{T} h$
$V_f = (\overline{T}/6) \, tang \, x_f \, (R_o^3 - r_i^3) + r_i^2 \overline{T} \, tang \, x_f \, (R_o - r_i)$ WITH  V = DELIVERY VOLUME; ta = táng = tangent 4,712,381

FLUID HANDLING ELEMENTS AND COMBUSTION ENGINES

REFERENCE TO RELATED APPLICATIONS

This application is a continuation-in-part application of Ser. No. 06/282,990 filed 07/14/81, now U.S. Pat. No. 4,557,347 and Ser. No. 06/338,741 filed 01/12/82, now U.S. Pat. No. 4,480,532 and Ser. No. 06/468,106 filed 02/22/83, now abandoned and Ser. No. 06/529,254 filed 09/06/83, pending.

The major portion of this application is a new invention, however, other portions are closed related to U.S. patent application Ser. No. 06/224,769 filed 01/13/81, now abandoned and Japanese patent application No. 141,584 filed 09/09/81.

BACKGROUND OF THE INVENTION

1. Description of the Prior Art

Closely related former art is not yet known to me. I therefore consider the former art to be the generally known disc springs and the generally known four stroke and two stroke gasoline and diesel engines. A further former art may consist partially in my own patents, which are summarized by numbers of U.S. and Japanese patents in my co-pending Japanese patent application serial No. 54-164,869 of Dec. 20, 1979.

I assume, that the former art has drawbacks, which shall at least partially be overcome by the present invention.

2. Field of the Invention

This invention is related to improvements of combustion engines, crankshafts and combustion engines, improvements of fossil fuel combustion engines to a combination of fossil fuel and water steaming steam engine, as well as to elements to be used in pumps, compressors, motors or engines, whereby the elements may include tapered or coned portions with spring actions and strengtheners thereon.

SUMMARY OF THE INVENTION

One object of the invention is, to provide strengthening portions on a tapered disc with spring action capabilities in order to increase the critical pressure point of elements with such tapered discs at use in pumps or motors to a higher pressure of the critical pressure point.

Another object of the invention is, to provide additional plates and seal seats to an assembly of at least two tapered discs for the provision of a pumping element assembly for high pressure pumping, which may include the pumping of water.

A still further object of the invention is, to provide an improved crankshaft to reciprocating compressors, motors and combustion engines, wherein fluid pressure pockets are provided and filled with lubrication fluid under pressure in order to carry the load of centrifugal forces which act on the crankshaft at least partially by the pressure in the pockets and the surrounding sealing lands in order to increase the "rpm" of the engines. Thereby the output power of a given engine will be increased, while at the same time the weight of the engine might become decreased by eliminating the counter weight portions of presently used common crankshafts.

And, a final object of the invention is, to provide a fossil fuel combustion and steam engine, wherein fossil fuel, like gasoline, coal, petrol, oil or the like is burned in compressed hot air and water or steam is injected under high pressure to form small droplets which in the hot burned gases vaporize very fast to steam, whereby the water steaming takes the heat for steaming the water out of the heat of the hot combustion gas and thereafter participates in the expansion of the gas-steam mixture during the expansion or power stroke of the piston or expander of the engine. This final object of the invention provides such engine for constant volume or mixed constant-volume and pressure combustion in a cylinder as an internal combustion engine as well as for external combustion and steaming in an external combustion- and steaming-chamber between at least one compressor and at least one expander of such external fuel combustion and steam engine.

DESCRIPTION OF THE PREFERRED EMBODIMENTS

Figure 1:
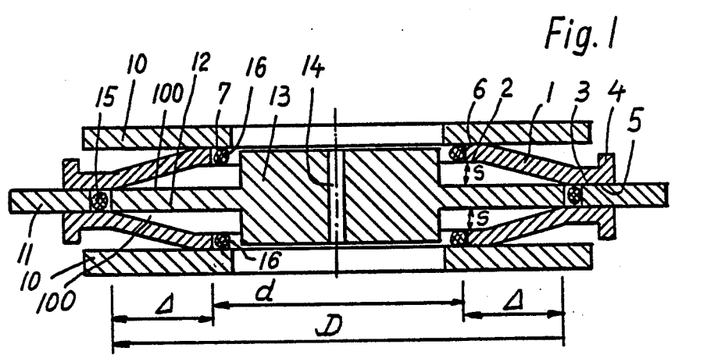
FIG. 1 is a longitudinal sectional view through an assembly of the invention.

Referring firstly to FIG. 1, the tapered element 1 has a tapered portion 1 like a disc spring. It is flexible and has a spring action capability in axial direction parallel to the axis of bore 14. The disclike element is hollow with a radial inner end 7. In FIG. 1 a plurality of such elements 1 are laid together in at least one pair of elements or discs. Each element of a pair is turned 180 degrees whereby the elements 1 are facing each other symmetrically relatively to a medial radial imaginary plane perpendicular to axis or bore 14.

Seals 15,16 are set to seal a pumping or motoring chamber or space between the two elements of a pair of elements or a disc-pair. Inlet means and outlet means are attached to the working chamber, pumping or motoring chamber or space as known from my parental patent applications Ser. Nos. 224,769 and 282,990. The inlet means and outlet means are commonly inlet valves and outlet valves or closeable inlet and outlet ports.

According to my elder application Ser. No. 282,990, such disc pairs are working satisfactory in the subcritical range. The subcritical range is that range, where the strength of the disc exceeds the force which tends under pressure in the spring-chamber to depart the discs away from each other. For high pressure in the chamber it was required to clamp two discs together in order to prevent the departure of disc portions and seals from each other under the high pressure in the supercritical range, where the forces of pressure in the chamber between the discs would exceed the holding spring strength of the disc portions 1.

The invention now overcomes the requirement of clamping of disc pairs, which is expensive, by the extension of the critical pressure point between the subcritical range and the super critical range to a higher critical pressure point. Thereby the expensive clamping can be spared until the extended higher pressure point in the chamber is reached.

To obtain the extension of the pressure range between the subcritical and the supercritical ranges to a higher pressure, the discs are in accordance with this present invention provided with strengthening portions.

In FIG. 1 the strengthening portions are portions 3 and they extend radially outwardly from the tapered portions or spring-action portions 1. Additional strengtheners 4 are added in FIG. 1 to the strengthening portions 3. They are extending axially from the outer portions of strengthening portions 3.

Figure 2:
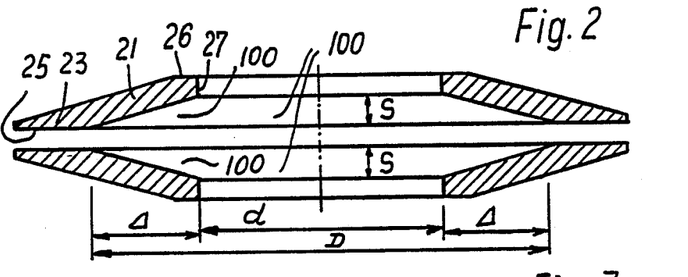
FIG. 2 is a longitudinal sectional view through elements of the invention.

In FIG. 2 the strengthening of the disc is obtained from a conventional disc spring by grinding or machining the outer axial end portion of to a radially plane face 25, which at the same time is one of the seat faces. FIG. 2 thereby provides a very simple and inexpensive disc for a higher critical pressure point. Because common disc springs which are inexpensively available on the market can be used. It should be noted however, that the available stroke of the disc spring will decrease.

Figure 3:
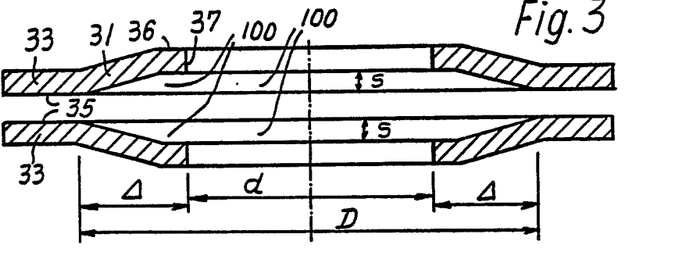
FIG. 3 is a longitudinal sectional view through elements of the invention.

In FIG. 3 another simple strengthened disc with spring action for the increase of the critical pressure point to a higher pressure is shown. Here the outer ends are formed as flat discs 33, which constitute the strengthening portions in this Figure. The radial inner portions are extending radially inwards from the tapered portion 31 and form there the one seat face 36, while the outer portions 33 form the other seat face 35.

The strokes of the flexible pumpable discs with inclined stroke portions 1,21,31 in FIGS. 1 to 3 are able to make a stroke "S" as shown in the Figures. For a long lifetime of the discs of the invention the appearing strengths in the portions of the elements should be considered. Short strokes "S" will increase the lifetime, because the strengths in the materials will then vary between closer values than they would at longer strokes "S". Material and details of the forms have a great influence on the lifetime and on the permissible maximum of strokes in units of time.

When the elements of the invention of FIGS. 1 to 3 are used as pump(s), a top holding plate 10 and a bottom holding or support plate 10 are assembled. These top and bottom plates form end plates, when the axes of the elements are laid horizontally. The pump head of FIG. 9 may be assembled to one end of the pump element set and a stroke drive means may be set to the other end of the element pair. The parental applications show details of samples of pump heads and of drive means for driving the strokes "S" of the elements.

Figure 9:
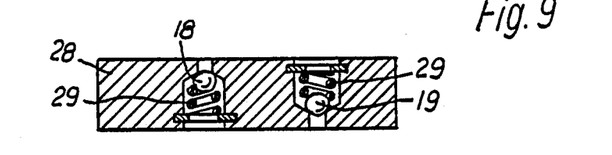
FIG. 9 is a longitudinal sectional view through a pumphead of the invention.

In FIG. 9 a simple sample of a pump head is provided. It may be laid as pump head 28 onto one end face (seat face) 26 or 36 or 6 of the set of FIGS. 1, 2 or 3. Head plate 28 contains the inlet valve 18 and the outlet valve 19. The valves may be supported by springs 29. Instead of valves other inlet and outlet means may be provided, if so desired.

FIG. 1 also demonstrates, that it is desireable and of benefit to lay the ring plate 11 between the opposed elements in order to be able to obtain a seal seat for the plasticly deformable seal 15, which in this case is the medial seal or inner seal 15. The end plates 10 are commonly getting smaller inner diameters than the elements 1,21,31, in order to form a seal seat for the end seals 16. These end seals 16 are also of plasticly deformable material, for example, O-rings. The medial outer ring plate 11 must be of a relatively big outer diameter in order to maintain enough radial strength against radial deformation. Otherwise the ring plates 11 and 10 may be plates, which are simply grinded on surface grinders in order to have radially plane and parallel axial end faces.

Thus, the ring plate 11, which is also called "the outer ring", should extend radially outwardly beyond the outer diameters of the elements or coned rings 1. It should also be attempted to make the radial dimension suitable to obtain equal radial deflection of the ring plate 11 under fluid pressure from the inside as the radial deflection of the outer ends of the coned rings 1 at their seats 5 is under the axial compression of the coned rings in order to prevent or reduce friction at radial relative movement between the rings 11 and 1.

For pumps it is important to prevent dead spaces or dead volumes inside of the pump means. Because a big volume in the pumping chamber 100 inside of the spring pair or inside of the pair of elements of the invention would fill the volume with fluid. Fluid is however compressible at least slightly and would compress considerably under the high pressure for which the pump of the invention is desired.

Therefore dead space fillers 13 are assembled inside of the pumping or working chamber 100. Because without them, the pump would have a reduced volumetric efficiency because of the compressibility of fluid. The dead space filler 13 reduces the amount of fluid in the pumping chamber and thereby the amount of compressibility in the chamber. Because the dead space filler 13 is made of uncompressible material, for example, of steel, Iron, Carbon fiber or the like. A passage 14 must be provided in order to permit the fluid in the bottom portion of the pump chamber to flow into the top portion of the pumping chamber and vice versa.

Filler 13 commonly gets a medial radial extension ring 12 which also acts as dead space filler. At same time it can be a seal holder to keep the medial seal 15 in its place.

End plates 10 and medial radial extension plate 12 also serve as supports for the tapered spring action portions 1,21,31 of the elements of the invention. Because if there would not be axially strong supports, the tapered springable portions 1,21,31 of the elements might axially bow or bend out or break under the very high inner pressure in the chamber between the portions 1,21,31. The pump of the invention is able to work with pressures of many hundred atmpspheres, for example, also with thousand atmospheres, if the assemblies of FIGS. 1 to 3 are used. At such high pressure even strong spring steel might bow or bend.

The calculation of the delivery of the pump per stroke "S" of an element of the invention is done, as follows:

An infinitesimally small radial portion of the tapered portion of the element may be: "dR", while the respective axial portion of the said portion of the element may be: "dY". This gives the tapered area: "dA".

Figure 10:
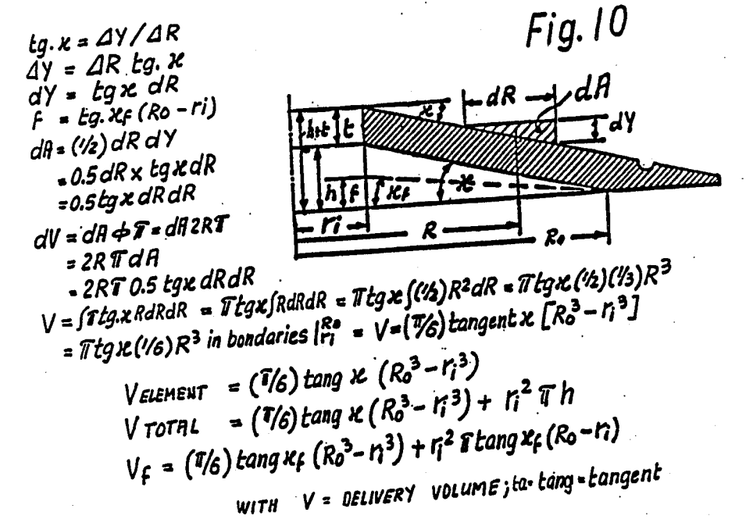
FIG. 10 is a mathematical explanation of an element of the invention.

Thereby FIG. 10 is obtained and it brings the development of the calculation of the pumping action as shown in FIG. 10.

The pumping delivery volume of the tapered portion 1 of an element of the invention then becomes:

$$V_T = (\pi/6) tg\kappa [R^3 - r_1^3] \quad (1)$$

The radial extension of the tapered portions 1,21,31 is shown in FIGS. 1 to 3 by the greek letter "delta" and is the half of the difference between the inner diameters "d" and the outer diameters "D" of the tapered portions 1,21,31 of the elements of the invention.

The delivery volume radially inside of the inner diameter "d" per a stroke "S" of the element is $$V_d = r_1^2 \pi S \quad (2)$$

wherefrom follows, that the sum of the delivery volume per partial stroke "f" of the stroke "S" is:

$$V_f = (\pi/6) tg\kappa_f [R^3 - r_1^3] + r_1^2 \pi tg\kappa_f (R_o - v_i) \quad (3)$$

and, wherefrom also follows, that the delivery volume of a pair of elements, as shown in FIGS. 1 to 3, is 2 times of the calculated volume "$V_f$" of equation (3).

In the above equations the following measures may by way of example be used: V=volume in cubicmillimeter and radii R and r in millimeter. Pi is about 3.14 and kappa is the angle kappa of FIG. 10 to be used in degrees.

For more details of the technology of the elements of the invention, Rotary Engine Kenkyusho Report RER-8109 may be studied. It is available from Rotary Engine Kenkyusho, 2420 Isshiki, Hayama-machi, Kanagawa-Ken, Japan, against payment of the costs and against information for what the study of the report is desired.

Another consideration, which underlies my invention(s), is the following:

When fuel, for example petrol or gasoline, is injected into the hot air in the cylinder of an engine, the fuel is pressed under a medial pressure of a few hundred atmospheres through a nebulizing jet into the hot compressed air in the cylinder chamber. The fuel thereby forms into small droplets of a high velocity. The small droplets of the then almost vaporized or nebulized fuel are vaporizing to a gas the faster the injection velocity, the higher the heat, and the smaller the ball particles of the fuel are. The size(s) and injection velocities depend naturally on the form and size of the jet wherethrough they are injected, but also extremely on the pressure with which the fuel is injected. The injection speed is basically a function of the injection pressure by the basic equation:

$$W = \sqrt{2P/\rho} \quad (4)$$

with "W"=velocity; P=pressure and "rho"=density. If for example, water is injected, the injection velocity may reach roughly the sonic speed of water of roughly 1400 m/s at an injection pressure of ten thousand athmospheres, when losses in the jet and other losses are neglected.

Having now shown in my parental applications, that the elements of the invention can also be used as water pumps for very high pressures of many hundred or even a few thousand athmospheres, and, having shown in my co-pending Japanese patent application serial No. 56-181,584, that the dead space can be eliminated in cylinder-combustion engines, whereby the compression end pressure can be rised very high, I now conclude, that it should be possible to speed up the combustion of fuel in combustion engines and thereafter inject water under high pressure for the very fast transformation of water into steam. It should then be possible, to obtain a "FOSSIL FUEL COMBUSTION-STEAM ENGINE" which would for an impressive portion of the expansion work as a steam engine and thereby save fuel and reduce the fuel consumption of combustion engines to a fraction of the present fuel consumption per unit of given power.

Figure 4:
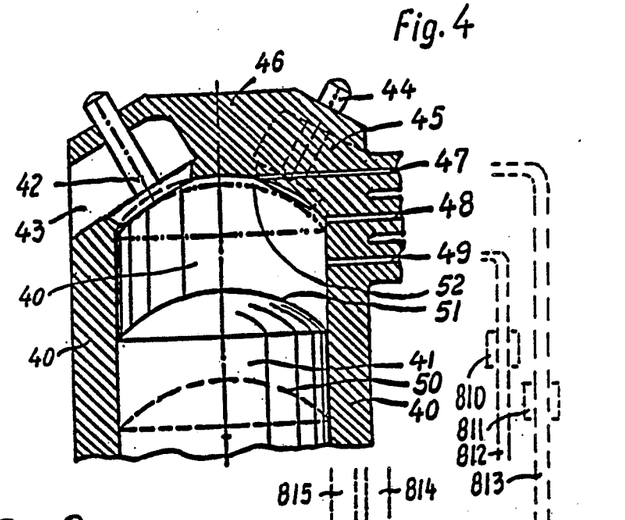
FIG. 4 is a longitudinal sectional view through an engine of the invention.

FIG. 4 shows in a longitudinal sectional view through the basic concept of one of my fossil fuel combustion steam engines of the present invention.

Piston 41 is reciprocating in cylinder 40 with cylinder head 46. Demonstrated are the following positions or locations of the piston 41:

dotted lines 50 show the outer poition of the piston head;

full lines 51 show the operation start position of the piston head; and, point-dotted lines 52 show the inner position of the piston head of piston 41.

These different positions or locations of the piston head of piston 41 are important for the understanding of the engine of the invention.

The first position 50 is the outer location, at which the piston is retracted into the outermost position, at which the cylinder 40 has its greatest volume.

When the piston 40 moves upwards in the cylinder towards its innermost location, commonly the piston compresses the intaken air. The inlet valve is then closed in the common four stroke engine.

In the engine of my invention, as illustrated in FIG. 4, however, the inlet valve 42 is kept open all the time when the piston 41 moves upwards from the first position to the second position 51. The second location 51 is the location, at which the inlet valve 42 closes the intake 43 and thereby the compression of the intaken air begins, when the piston 41 moves further upwards towards its third or innermost, the inner position or location 52. The important position 51 is therefore also called the starting position or the operation start position, or location.

After the piston 41 reached its third or innermost location, the air is compressed. I prefer to compress it to a high pressure in a very small volume. For example, to a much higher pressure than in common four stroke gasoline engines.

At the third position 52 of the piston 41 I inject fossil fuel under very high pressure through injection device 47 to steam the fuel very fast in the hot air for a very fast combustion under high temperature and increase of pressure and temperature. It is important, to note, that, when the second location is in the middle between the 1st and 3rd locations 50 and 52, the air taken in is only the half of the maximum of the cylinder volume. Consequently only the half of fuel compared to the common engine is needed to burn in stoichiometric value 1 in the smaller amount of air, namely in the half amount of compressed air of the common four stroke gasoline engine. That shows, that my engines uses only a fraction of fossil fuel of the common four stroke gasoline engine. In the discussed sample, a half of it.

This would make the impression, that my engine would also give only the half of the power of the common four stroke engine of equal maximum of volume of the cylinder 40.

That however, I do not assume.

Because, according to my invention, the compression was very high, the temperature at location 52 of the piston after combustion or slightly down therefrom in the expansion stroke is very high and my fuel balls were gassed fast due to the high pressure injection. Thereby the fuel combustion was very fast, hot and intensive. However, the high temperature could not heat the walls 40 of the cylinder much, because the combustion and heating up in my engine was so very fast, due to my high injection pressure.

Therefore, as soon as the combustion of the fuel is about completed, I inject water, preferrably pre-heated water close to steaming, through the first injection means 48 under again a very high pressure in order to obtain very small water droplets of high velocity at the water injection. These water droplets will transform or vaporize into steam again very fast. The fast, the better. And, the fastness of steaming is obtained by the very high pressure of my water injection. Because my invention(s) gave me the inexpensive high pressure water pump.

When water transforms into steam at atmospheric pressure, the steam will take a volume, which is roughly 1600 times the volume of the water which is steamed. And, for example at 100 atmospheres combustion pressure the steam will still take roughly eighty times of the volume of the water, which becomes injected.

Therefrom follows, that the amount of water, which is to be injected to fill the rest of the cylinder, which was not filled with air at the upwards stroke of the piston 41, is rather small. The injection of water under high pressure may either be done by a single water injection means 48 or by a plurality of water injection devices 48, 49 in succession.

Figure 5:
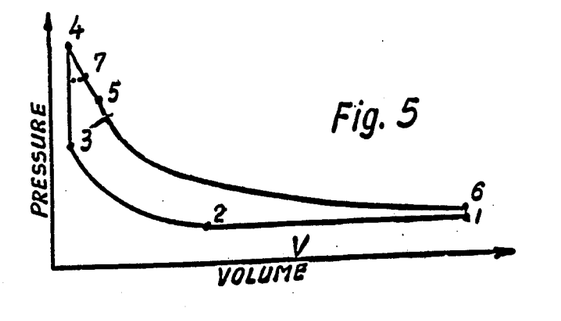
FIG. 5 is a diagram of the engine of FIG. 4.

The actual amount of water to be injected depends also thereon, at which pressure 6 in the pressure-volume diagram of FIG. 5 the gas-steam shall exhaust at the outer position 50 of the piston after the expansion stroke, when the outlet valve 44 opens.

FIG. 5 shows the volume-pressure diagram of the engine of FIG. 4. The first location 50 of piston 41 is below 6 at 1 in the V-P diagram of FIG. 5. At the piston stroke from the first location 50, (in FIG. 5) to the second piston position 51, the stroke 1-2 is done in the V-P diagram of FIG. 5. The inlet valve 42 is open and the pressure remains the atmospheric pressure 1.

At the second location 51 of the piston 41, which is position 2 in the V-P diagram of FIG. 5, the inlet valve 42 closes. At the further stroke of the piston 41 from its second location 51 to its third location 52, which is position 3 in the V-P diagram of FIG. 5, the compression of the intaken air occurs along the compression curve 2-3 in FIG. 5. Around point 3 in FIG..5 the fuel injection begins and the fast vaporization of the fuel and the fast following and completing combustion leads to the increase of pressure and temperature along the line 3-4 in the V-P diagram of FIG. 5. That is the time, when the piston 41 is in its third position or location 52. A portion may depart from the line 3-4 to the line 3-before 4-7 in case of a diesel like combustion. At the combustion-time remainder or after completion of the combustion, the piston 41 starts to move downwards in the expansion stroke. For example, along curve 4-5 in the V-P diagram of FIG. 5. In the meanwhile somewhere between points 4,7 and 6 in the diagram of FIG. 5 the injection of water has taken place and the water was transformed into steam. Actually fuel-combustion and steaming may partially temporarily mix. The steaming of the water will take a portion of the heat out of the combusting or combusted fuel-air-mixture. And, finally, the gas will further expand and the steam will expand substantially along the lines 4-5-6 in the diagam of FIG. 5 until finally in the first position of piston 41 the gas and steam will leave the cylinder 40, because the outlet valve 44 opens in the near of position 6 in FIG. 5. Finally the rest of steam and gas will be blown out of the cylinder between 6 and 1 in the diagram of FIG. 5. This may be done in the exhaust stroke of piston 41, or in case of two stroke operation immediately about in the position 6-1 of piston 41.

Actually some time for the steaming of the injected water will be needed and the gas-combustion may not be fully completed as explained heretofore, wherefrom follows, that the expansion may not exactly follow the expansion curves of presently common gas upon or diesel engines. The actual curves 4-7-5-6 will however become known further development of my engine and they will depend on the relative amounts of water to be injected. The relative amount of water will be the amount relatively to the volume of the entire piston stroke. Of influence also will be the percentage of the second location 51 between the outer and inner or first and third locations of the piston 41 in its upwards stroke.

In my considerations my engine of FIG. 4 should have a number of features. For example, the amount of fuel per unit of power obtained will be less compared to the present engines. Further, the combustion pressure will take place at higher pressures and temperatures, whereby the thermal efficiency of the engine is generally increased. Further, the steam from the water will considerably cool down the medial temperature of the expansion stroke from 4 to 6 in FIG. 5. Therefrom follows, that the amount of heat transfered to the wall of cylinder 40 will be considerably less, than in common engines. Consequently the losses by heat transfer to the cylinder walls will be smaller in my engine than in common combustion engines. Thereby again the efficiency of my engine will become higher than that of presently common combustion engines. A rule of the thumb was, that $\frac{1}{3}$ of the energy runs into the cylinder walls by heat transfer, $\frac{1}{3}$ of the energies runs into losses in the thermodynamic cycles and $\frac{1}{3}$ of the energies runs into the muffler or out of the engine in the exhaust. But with my engine, the losses of the $\frac{1}{3}$ to the cylinder walls should be reduced. And, my engine will use a smaller amount of gasoline than which is required at present in common engines of a given volume of a cylinder 40.

It is true, that my engine also has problems. For example, my engine must drive my water injection device(s) which is to be taken away from the power produced in the engine by the injected fuel. The amount of energy to drive the injection devices, however is small compared to the efficiency benefits obtained. Also true is, that the vehicle which uses my engine will have to carry a tank with water in it, which is uncomfortable compared to the presently common vehicles. However the benfit by saving fuel and saving money at the gasoline stations when the fuel is bought, is so considerable, that the overall benefit if the engine appears.

Naturally, the thermodynamic details must be obeyed in the use of the engine. The amount of airintake must be in balance with the amount of fuel injected. The amount of water injected must be suitable to take the heat from the combusted gas. It must be in balance with the expanded burned fuel-air mixture. These details will be worked out more in detail in the coming development of my engine. If my time will permit it, the thermodynamic and mathematical relationships will be established at said development of my engine and at a later time probably become published.

Figure 6:
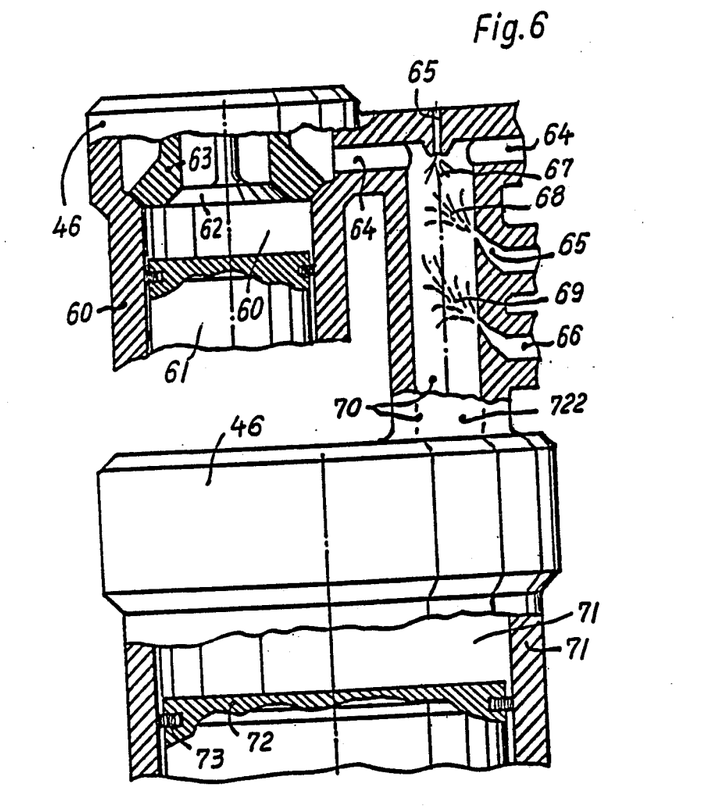
FIG. 6 is a longitudinal sectional view through an engine of the invention.
Figure 8:
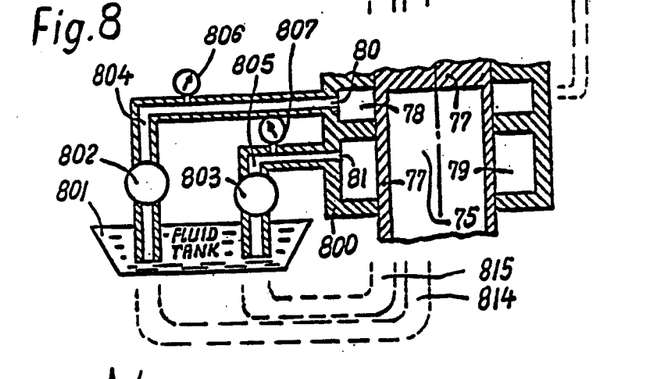
FIG. 8 is a longitudinal sectional view through an arrangement of the invention.

FIG. 8 demonstrates, that care has already been taken to make very hot temperatures possible in the engine of FIG. 4 or 6. When such temperatures become very high, for example around 3000 to 4000 centigrade, the common cast iron or aluminium cylinder wall may not be useable any more. Materials for higher pressure and temperatures may be used for the walls of cylinders 4o,60,71 in FIG. 4 or 6. Such high-pressure-high temperature material might then be brittle. It may require a outer strengthening means, or holding means.

Consequently, FIG. 8 demonstrates, that an outer holding or support frame may be set around the respective cylinder 76. Such outer housing 800 may form outer chamber(s) 78,79 or more outer chambers around the cylinder 76. Through entrance(s) 80,81 fluid under pressure may then be led from a tank 801 by a source of different pressures 806,807 over passages 804,805 into the outer chamber(s) 78,79. That may be done temporarily and parallel to the pressure which appears at the respective time inside of the cylinder 76. Because I have the pumping devices to supply such pressure disclosed in my invention(s).

The consequence of the arrangement of FIG. 8 therefore is, that even a brittle material of cylinder wall 76 may not break, because the pressure from the inside and that from the outside may be at all times equal or considerably nearly equal or at least partially equal, so that one sided break-tending forces are avoided or reduced.

One possibility also is, to lead water into the outer chamber(s) 78,79 to warm it by the heat from the cylinder wall(s). The benefit therefrom would be, that the injected water would already be hot and would take less heat energy away from the combusted air-fuel mixture in the cylinder.

A side benefit might become, that the water in the outer chamber(s) 78,79 may already steam near the outer face of the wall of the inner cylinder 76. Such steam might be separately taken off from chamber 78 or 79 and be used to be jetted against the water injection stream in order to vaporize the injected water to still smaller balls.

The speed of the transforming of the water balls into steam, the sizes of the water balls in dependance of the injection pressure and so on, could be calculated by my mathematical works of 1945-1946 "Verdampfung von Fluessigkeitstroepfchen in heisser Luft". Regrettably however, the extensive mathematical works have become lost over the time and can not be found immediately now. They may be contained in some of my "last wills" which have been deposited at courts at places where I lived at the respective times.

Since I have disclosed in at least one of my mentioned co-pending patent applications, that high pressures can also be obtained by external combustion engines with small or no dead space in the compressor(s), it is also possible to run my fossil fuel combustion steam engine as an outer or external combustion engine with a separated or external combustion chamber.

Figure 7:
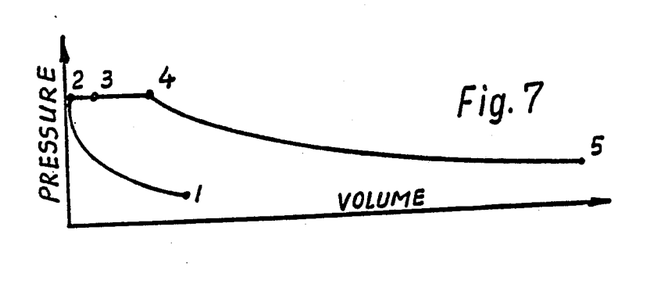
FIG. 7 is a diagram of the engine of FIG. 6.

FIG. 6 demonstrates a schematic longitudinal sectional view through an external combustion fossile fuel steam engine of my invention(s) with the thereto belonging volume-pressure=V-P diagram of FIG. 7.

At least one compressor 60,61 (with for example cylinder 60 and reciprocating piston 61 therein) delivers the compressed air through the outlet valve 63 over passage 64 into the external combustion chamber 70. Fossil fuel, like oil, gasoline, petroleum, diesel fuel, coal, coal powder, coal blocks of my mentioned Japanese patent application or the like is injected through injection means 65 for an immediate combustion in the external combustion chamber 70 in the air which was delivered through passage 64. When there are more than one compressor, there may also be multiples of passages 64, as the Figure shows.

After the combustion of the fuel or close to the end of the combustion of the fossil fuel, water is injected into the hot gases. In this case of FIG. 6, however, not into the cylinder, but into the external combustion chamber 70. The injection of the water may be done by a single injection means 65 or by plural injection devices 65, 66. The injected small ball water streams are shown by references 68 and/or 69. This water steams and expands similar to FIG. 4, however, within the external combustion chamber 70 or at least partially therein. Thereafter the still pressurized gas-steam mixture leaves the external combustion chamber 70 to flow through passage 722 into the larger expansion cylinder 71, to expand therein under driving of piston 72. Piston rings 73 may be applied for sealing, as common. The sizes and strokes of the compressor(s) and of the expansion cylinder 71 with piston 72 must be in the proper relationship and so must be the amount of injected fuel and of injected water. Cylinder head with valves may be set onto cylinder 71 as shown by 46. The valves are preferred to be those of FIG. 6, namely inlet valve 62 located inside of outlet valve 63 with flat front faces to obtain the deadspaceless cylinder(s) 60 and/or 70. More details of said valves are in my mentioned co-pending application(s).

FIG. 7 shows and demonstrates the compression stroke along line or curve 1-2 and thereby the compression of the intaken air. Line 2-3 shows the constant pressure combustion of the fossil fuel in the compressed air which takes place after the fuel injection into the external combustion chamber 70. Line 3-4 shows the steaming of water and the expansion of the water-steam still at constant pressure in the external combustion chamber 70 after the water-injection. And line 4-5 shows the expansion at reducing pressure of the gas-steam mixture in the expansion or working stroke of piston 72 in the expansion stroke or working stroke of the piston 72. At 5 in FIG. 7 the gas-steam mixture leaves the cylinder 71 after the opening of its outlet valve.

A further improvement of the efficiencies of the engines of FIGS. 4 to 8 is possible by heating the water which shall become injected into the cylinder(s). Such heating of the water may be done in the exhaust gases and/or on the walls of the cylinders and/or cylinder head and/or in the chambers 78 or 79 of FIG. 8. As more as the water is pre-heated close to the steaming point at the respective pressure as smaller becomes the heat which the water will take away from the heat value of the fuel when the water is injected into the cylinder(s). The pre-heating should as far as possible be utilized to make use of the heat energy which would otherwise be lost for cooling purposes or which would flow away in and with the exhaust gases. Since heat is available in the exhaust gases and since a cooling of the engine parts, like cylinders etc. is often required, and, since the water would only have to be led through the exhaust gases or along the to be cooled faces in order to take heat away from the gases or parts and to use this heat for heating itself up, such procedure is economical and makes effectively use of heat value which would otherwise be lost.

The application of a pre-pressure charger, for example, a turbo charger before the air intake port of the engine(s) can also increase the power and/or efficiency-(ies) of the engine(s).

Figure 11:
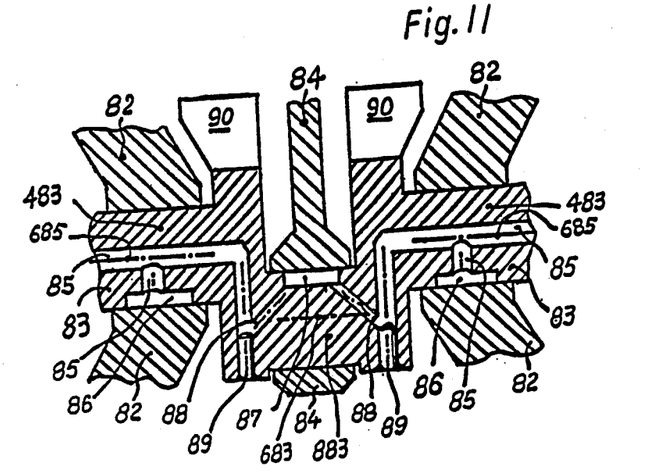
FIG. 11 is a longitudinal sectional view through a crankshaft of the invention.

FIG. 11 demonstrates a general improvement of the output power of crankshaft operated combustion engines. These engines work very effectively in motor bikes, cars and the like. However, they are still too heavy for use in vertical take off aircraft. I therefore desire to obtain a bigger output of power from such engines at a given weight. This is obtained partially by the application of my rotary valves with big inlet and outlet cross-sectional areas, for example, of my German patent publication serial No. 3,135,675. The double turbo charger arrangement of my U.S. patent application Ser. No. 807,975 also adds to the increase of output power per a given weight of the engine.

However, one limitation for the output power of engines is given by the centrifugal forces of the connecting rods which surround the eccentric portions of the crank shafts. The centrifugal forces created by the con-rods become so high at high rpm., that the hydrodynamic fluid films in the crankshaft bearings can not bear the centrifugal forces any more. The bearings would tend to weld, if the rpm would become further increased.

FIG. 11 overcomes these limitations of the rotary revolutions of such engines and makes higher rpm and thereby higher power possible. I obtain the higher rpm and power per engine by applying hydrostatic pressure pockets in the crankshaft bearings at the specific places, where the high centrifugal forces act The pressure in the pockets is obtained from a pressure supply source and the cross-sectional area of the pockets and of the sorrounding sealing lands is properly dimensioned to permit them to bear the appearing centrifugal forces accurately. The counter weights on crankshaft portions can thereby partially or entirely be spared and the weight of the engines can become reduced while the output power becomes increased.

Thus, according to FIG. 11 I drive an oilpump by the crankshaft. I prefer to use a variable pump of one of my patents mentioned in the Japanese patent application Ser. No. 54-164,869. Preferred is such a pump, which is variable in delivery quantity of fluid per revolution. The oilpump or its delivery flow may additionally be adapted to a control of the height of the pressure in the fluid which is delivered. The quantity delivery control and the pressure hight delivery control may be adapted to a control in dependence of the rpm of the crankshaft of the engine to supply the correct amount of oil quantity and of pressure therein into the fluid pressure pockets 86,87 of the crankshaft bearing(s) of my engine of FIG. 11.

The oil or fluid is delivered from the said pump into passage(s) 85 in crankshaft 83 of the engine. Crankshaft 83 revolves with centric bearings in housing or crankcasing 82. The crankshaft 83 has the eccentric bearing portions 883 which carry and bear the connecting rod(s) 84.

According to the invention, the hydrostatic pressure pockets 86 with sorrounding sealing lands are provided in the concentric crankshaft bearings at those places of the crankshaft, where the centrifigal forces of the eccentric portions 883 of the crankshaft are causing a load. A branch assage 85 delivers the pressure fluid from the main passage 85 into the respective pocket 86. As seen in the Figure, the branch passages 85 can be very easily drilled into the crankshaft, because they are just radially directed and open radially outwards, where they port into the respective pressure pockets 86. Other branch passages 85 branch also radially directed off from the main passage 85 and they are meeting the inclined passages 88, which port into the pocket(2) 87 in the eccentric portion(s) of the crankshaft. The now mentioned branch passages 85 are radially outwardly closed by closers 89. The eccentric fluid pressure pocket(s) 87 are set into the crankshaft at that place(s), where the centrifugal force of the connecting rod(s) 84 applies (apply) a load. As seen in the Figure, the pockets 86 and 87 are diametrically opposed in the respective crankshaft portions. The cross-sectional area of the pressure pocket(s) 87 and the surrounding sealing lands(s) are properly dimensioned to carry at the respective "rpm" of the crankshaft the load of the centrifugal force created by the conrod(s) 84 in combination with the pressure in the fluid at the respective time.

The proper arrangement of the location and sizes of passages, pockets and sealing lands in combination with the quantity and pressure of the sealing fluid supplied into the passageas and into the pockets 85,87,86,88 makes it also possible to take off entirely or partially the counter weights 90 of the presently common crankshafts of engines. Thereby the weights of the engines can be reduced, while at the same time the rpm and thereby the output power of the engine(s) can be considerably increased.

Referring again to the fuel combustion steam engines of FIGS. 4 to 7, it should also be considered, that the pressure in the combustion stage could be raised above the pressure of the critical point of steam and water. This critical point commonly is around 225 atmospheres. The steam than takes a volume equal to the volume of water of equal quantity. The steaming heat to steam water into steem is then zero. Further it should be obeyed that the polytropic exponent of steam and of overheated steam is not equal to the compression exponent of air.

These are matters of further investigation. Not all details of behaviour of the engine of FIGS. 4 to 7 are fully known presently. It may therefore be desired to run the expansion partially with overheated steam. It might also be desirable not to take all the heat out of the combusted fuel-air mixture and run in the expansion a combination of burned fuel air-gas and steam or overheated steam expansion. The relation of the location of the second location 51 of the piston 41 at the compression stroke may have a big influence as well as the amount of water injected. Further it may become of great influence at which location the injection devices 48,49 etc. are placed relative to the third and first locations of the respective piston, for example, 41.

To details of design belongs also, what is desired in the specific design of the engine. Either higher efficiency and saving of fuel or better cooling of the parts of the engine. An other consideration in design might be, whether the specific engine will be desired for greater power output or for greater economy. It is therefore not excluded in specific design cases to maintain the major portion of expansion with fuel-air burned mixture, but with limited water injection if so desired.

FIG. 8 illustrates in dotted lines how, for example, the water may become pre-heated. The suction lines which may be under a certain pre-pressure, lines 814 and 815, lead the water through the exhaust gases after the outlet valve 44 of FIG. 4. The fluid lines 814 and 815 deliver into the fluid pumps 802 and 803 of FIG. 8. The water then passes through fluid lines 804 and 805 into the cooling and pressure chambers 78 and 79 respectively after the pressure in these fluid lines was increased in the pumps 802 and 803. The water is now already highly heated and may be close to steaming point under the now already high pressure. From the chambers 78 and 79 the heated and pressurized water may flow on through fluid lines 812 and 813. Into these fluid lines the high pressure pumps 810 and 811 may be set, respectively. They may be pumps as those of FIGS. 1 to 3 with FIG. 9. With the high pressure of these pumps the water may flow on over respective timing valves through the fluid lines 812 and 813 towards the injection ports 47, 48 or 49 of FIG. 4 or the respective ports of FIG. 6 for the injection into the respective cylinder or combustion chamber. These arrangements are by way of example. Other suitable devices to obtain a similar effect may be used.

From the beforegoing description it will be understood that the first fluid in the inner chamber 40 of FIG. 4 is a gas, commonly air, entered through inlet valve 42 and exhausted through outlet valve 44 while the fluid in the outer chamber(s) 78,79 of FIG. 8 is a second fluid which may be defined as an "outer fluid" and is commonly in its original state a liquid (commonly water) which may be heated up or steamed in the outer chamber(s) 78,79 and/or in the inner chamber 40 when it is passed into the inner chamber 40 inside of wall 40 of cylinder 40 of FIG. 4. The piston 41 in cylinder 40 in FIG. 4 is connected to a power output means in the common way, for example, by a connecting rod to a crankshaft. It may so be connected by conrod 84 also to the crankshaft 483,883 of FIG. 11. A piston 41 is commonly also provided in the inner chamber 75 of FIG. 8 but not shown in FIG. 8 because it is shown in FIG. 4. Instead of providing the passage means 812,813 from the outer chamber(s) 78,79 to the cylinder 40 of FIG. 4, they may also be provided (led) from the outer chamber(s) 78,79 of FIG. 8 to the cylinder and inner chamber 77 and 75 of FIG. 8. That is, however, not shown in FIG. 8 because the entrance passages, ports, for the outer fluid are more clearly illustrated in FIG. 4. Basically the cylinder 40 of FIG. 4 and the cylinder 77,75 of FIG. 8 are substantially equal cylinders. However, different details of the substantially equal cylinders are illustrated in FIGS. 4 and 8 to avoid unclearness of the Figures by an overload of referential numbers and lines.

Having heretofore described the embodiments of the invention in terms of commonly understood terminology, the aims, objects and embodiments of the invention might partially also in different terms of technology be described for more clearaer definition of the invention as follows:

1. A pumping assembly including a tapered pumping element 1,21,31 portion of flexible and spring-actionable material, a drive mechanism for the decompression and compression of said tapered element portion and inlet means 18 and outlet means 19 provided to a pumping chamber 100 which is created in said assembly within at least a portion of at least one of said tapered elements,
   wherein at least one strengthening portion 3,4,23,33 is provided on said element,
   in order to increase the critical pressure point of said assembly at which said element would change from the subcritical to the supercritical pressure range.

2. The assembly of 1,
   wherein at least one pair of said elements 1,1 or 21,21 or 31,31 is assembled with oppositional axial direction, whereby said chamber 100 is formed between two adjacent elements of said pair of elements.

3. The assembly of 2,
   wherein at least one dead space filler 13 is provided in said chamber, and at least one ring 11 is assembled between said elements 1 of said pair of elements to hold a plasticly deformable seal ring 15 on its inner face and between said elements of said pair of elements.

4. The assembly of 1,
   wherein said element 21,31 is provided with a radial inner portion 26,36,7 which forms a radially plane seat 26,36 to be laid against another ring 10 or body 28 of said assembly, and,
   wherein at least one plasicly deformable seal ring 16 is laid into the interior of said inner portion 7,26,36 of said element.

5. A crankshaft 83 in a compressor, pump, motor expander or in a reciprocating combustion engine with centric portions 483 which are borne in bearings in a respective crankshaft casing (housing) 82, with at least one eccentric bearing portion(s) 883 with an axis (axes) 683 parallel to the axis 685 of said centric portions, but radially distanced therefrom, wherein said eccentric portion(s) bears(bear) at least one connection end of at least one connecting rod 84 between said crankshaft and a piston which reciprocates thereby in a cylinder of said compressor, expander, pump, motor or engine, and, wherein passages 85,88 are provided in said crankshaft to supply lubrication fluid to said bearings,
   wherein fluid pressure recesses 86 and/or 87 are provided to form fluid pressure pockets in said crankshaft and supplied with fluid under pressure through said passages 85,88 to form with sealing lands, which surround said recesses local hydrostatic bearings in specific locations on said crakshaft and in said bearings relatively to said centric and eccentric axes.

6. The crankshaft of 5,
   wherein said recesses 86,87 are located and said pockets are formed at those places of the crankshaft 83, where a respective local load appears.

7. The crankshaft of 6,
   wherein said recesses 86 and pockets of said centric portions are directed radially opposed to said recess 87 and pocket(s) in said eccentric portion.

8. The crankshaft of 7,
   wherein said recess 87 and pocket in said eccentric portion 883 is located in said radial direction, in which the centrifugal force of said connecting rod(s) 84 appears, when said crankshaft 83 revolves.

9. The crankshaft of 6
   wherein said recesses 86 and pockets of said centric portions 483 are dimensioned to such large size, that they are able to carry the forces transferred from said eccentric portion(s) 883 to said crankshaft 83 and,
   wherein heretofore common counter weight portions 90 of said crankshaft 83 are eliminated in order to decrease the weight of said crankshaft.

10. A combustion engine of FIGS. 4 or 6 including a compressor stage for the intake and compression of air, an inlet means 47,65 for the inlet of a fossil fuel like oil, gasoline, coal, petrol, gas, a combustion stage for the combustion of said fuel in said air and an expansion stage for the expansion of said burned fuel in said air,
   wherein a water injection device 48,49,65,69 is provided on said engine to inject and nebulize water in said combustion stage or in said expansion stage,
   wherein the heat after the combustion of said fuel in said combustion stage is utilized to steam said injected water, and
   wherein the expansion of said steam is utilized in said expander stage alone or in combination with the expansion of said combusted air-fuel mixture in order to supply by said expansion in said expansion stage the outgoing power of said engine.

11. The engine of 10,
   wherein said engine has a reciprocating piston 41 in a cylinder 40 and said combustion stage is an internal combustion stage which combusts said fuel in said compressed air in said cylinder,
   wherein said piston in said cylinder obtains a first location 50, a second location 51 and a third location, 52,
   wherein said first location 50 gives the largest volume in said cylinder, 40, the third location 52 gives the smallest volume in said cylinder 40 and said second location 51 defines a location with a volume between said largest and smallest volumes,
   wherein the air inlet means 42 remains open when said piston 41 moves from said first location 50 to said second location 51 and closes when said piston 41 reaches said second location, 51
   whereby said air is compressed at the movement of said piston from said second location 51 to said third location, 52,
   wherein the amount of fuel intaken into said compressed air is properly dimensioned to burn in the amount of compressed air which is compressed at the movement of said piston between said second and third position, and,
   wherein water is injected into said cylinder during or after the combustion of said fuel in said compressed air and the injected amount of water is suitably dimensioned to transform by at least a portion of the heat value of said intaken fuel said injected water into a suitable amount of steam to drive said piston in the expansion stroke either alone or together with the gases from said combustion of said fuel in said air.

12. The engine of 10,
   wherein said compressor stage includes at least one compressor of a smaller volume, 60,61,62,63,46, said expansion stage includes at least one expander of a larger volume, 71,72,46,
   wherein an external combustion chamber 70 is provided between said compressor stage and said expansion stage and communicated f.e. by 64 and 722 to said compression stage and to said expansion stage while said compressor stage is driven by the expansion power of said expansion stage,
   wherein fuel is supplied into said external combustion chamber, f.e. by 65, ignited therein and burned in the said compressed air in said external combustion chamber 70, and
   wherein water is injected under high pressure for example by 65,69 into said external combustion chamber after after said fuel is burned in said chamber, 70,
   whereby said water which is injected into said combustion chamber is steamed in the heat of said combustion in said combustion chamber and expands in said combustion chamber or in said expander and participates in said expansion in said combustion and thereby participates in the supply of power out of said engine during said expansion in said expander.

13. The engine of 12,
   wherein said injected water and the therefrom resulting steam takes the steaming heat out of said combusted fuel-air mixture and thereby cools the temperatures during said expansion to a value which is considerably below the respective temperatures of the expansion in common combustion engines.

14. A cylinder 76 in a fluid handling device with high pressures and temperatures in said cylinder which vary in continuing cycles periodically,
   wherein at least one outer chamber 78,79 is mounted around the wall 76 of said cylinder and provided with at least one entrance port 80,81 in the housing 800 of said outer chamber, and, and,
   wherein a fluid under pressure is led into that outer chamber parallel to said cycles in order to provide substantially reduced pressure differences between the inside and outside of said wall of said cylinder and in the ideal application to provide substantial equal pressures at said cycles inside and outside of said wall of said cylinder in order to prevent breaking of said cylinder under high internal pressures in said cylinders, specifically if said temperatures in said cylinder are temporarily so high, that the walls of said cylinder are built of brittle material.

15. The crankshaft of 5,
   wherein the supply of lubrication fluid under pressure through said passages 85,88 into said at least one recess and pocket 86,87 is done by a variable hydraulic pump,
   wherein said hydraulic pump includes an adjustment device for the adjustment of the delivery quantity per revolution of said pump,
   wherein said flow delivered by said pump is subjected to a variable pressure control means for the adjustment of pressure in the fluid which is supplied by said pump, and,
   wherein said quantity of flow of fluid and said pressure in said flow of fluid are adjusted at different rotary angular velocities of said crankshaft in order to supply the respective pressures, fluid quantities and thereby bearing forces into said recesses and pockets at the respective times in accordance with the need of pressures, quantities of fluid and bearing forces in said bearings of said crankshaft at said respective times of said revolutions.

What is claimed is:

1. A cylinder in a fluid handling device with high pressures and temperatures in said cylinder which variate in continuing cycles periodically,
   wherein at least one outer chamber is mounted around the wall of said cylinder and provided with at least one entrance port in the housing of said outer chamber,
   wherein a fluid under pressure is from a fluid pressure supply means (pump) led into that outer chamber parallel to said cycles in order to provide substantially reduced pressure differences between the inside and outside of said wall of said cylinder and in the ideal application to provide substantial equal pressures at said cycles inside and outside of said wall of said cylinder in order to prevent breaking of said cylinder under high internal pressures in said cylinder, and, wherein an outgoing passage is provided on said outer chamber to transfer said fluid from said outer chamber into said cylinder.

2. A cylinder in a fluid handling device with temporary high pressures and temperatures said cylinder which vary in continuing cycles periodically, wherein at least two outer chambers are mounted sealed from each other around an upper portion and a lower portion of said cylinder while said outer chambers are formed in an outer housing which surrounds that outer chambers around said cylinder;

wherein individual ports are provided through said outer housing to said outer chambers individually;

wherein said outer chamber around said upper portion of said cylinder is a first outer chamber and said outer chamber around the lower portion of said cylinder is a second outer chamber with a first port of said ports on said first outer chamber and a second port of said ports on said second chamber;

wherein said first port is communicated to a supply source of a first pressure and said second port is communicated to a supply source for a second pressure to fill said first outer chamber with said first pressure and to fill said second outer chamber with said second pressure;

wherein said cylinder temporary obtains said first pressure substantially as a first medial pressure radially inwards of said first outer chamber, while said cylinder temporary obtains said second pressure substantially as a second medial pressure radially inwards of said second outer chamber;

whereby the wall of said cylinder is at least temporary subjected to substantially equal pressures in the respective areas of said wall radially inwards of said first and second outer chambers in order to prevent excessive radial deformation of said wall under different pressures outwards and inwards of said wall of said cylinder, wherein said first and second outer chambers are provided with exit ports and first and second fluid lines extending from said exit ports to respective entrance ports in said cylinder to pass said fluids from said outer chambers through said fluid lines to said cylinder.

* * * * *